United States Patent
Cho et al.

(10) Patent No.: US 10,203,132 B2
(45) Date of Patent: Feb. 12, 2019

(54) WATER HEATER SYSTEM

(71) Applicant: DAESUNG CELTIC ENERSYS Co., Ltd, Eumsung-gun (KR)

(72) Inventors: Sung Tae Cho, Cheongju (KR); Chul Hee Cho, Cheongju (KR)

(73) Assignee: DEASUNG CELTIC ENERSYS CO., LTD, Eumsung-gun (KR)

( * ) Notice: Subject to any disclaimer, the term of this patent is extended or adjusted under 35 U.S.C. 154(b) by 25 days.

(21) Appl. No.: 15/401,246

(22) Filed: Jan. 9, 2017

(65) Prior Publication Data

US 2017/0299222 A1 Oct. 19, 2017

(30) Foreign Application Priority Data

Apr. 18, 2016 (KR) .................. 10-2016-0046997

(51) Int. Cl.
*F24H 1/22* (2006.01)
*E03B 7/12* (2006.01)
(Continued)

(52) U.S. Cl.
CPC .............. *F24H 1/22* (2013.01); *E03B 7/12* (2013.01); *F24D 17/0078* (2013.01);
(Continued)

(58) Field of Classification Search
CPC ........ F24H 1/22; G05D 7/00; G05D 23/1393; F24D 17/0078; F24D 17/0026;
(Continued)

(56) References Cited

U.S. PATENT DOCUMENTS

| | | | |
|---|---|---|---|
| 2010/0096018 A1* | 4/2010 | Wylie | F24D 17/0078 137/2 |
| 2012/0090560 A1* | 4/2012 | Iwama | F24H 1/145 122/14.3 |

(Continued)

FOREIGN PATENT DOCUMENTS

| | | |
|---|---|---|
| GB | 2518471 | 3/2015 |
| JP | 3811998 | 1/1998 |

(Continued)

OTHER PUBLICATIONS

EPO, the extended European search report of EP 17166882.5 dated Sep. 29, 2017.
(Continued)

*Primary Examiner* — Steven B McAllister
*Assistant Examiner* — Steven Anderson, II
(74) *Attorney, Agent, or Firm* — Lex IP Meister, PLLC (57) ABSTRACT

A water heater system having a running water inlet through which running water flows in and a hot water outlet through which hot water heated in a heat exchanger is discharged is disclosed. The water heater system may include a first connection pipe connecting a gap between the running water inlet and an entry of the heat exchanger, a second connection pipe connecting a gap between an outlet of the heat exchanger and the hot water outlet; a bypass pipe connecting a gap between the first connection pipe and the second connection pipe, a bypass valve installed to the bypass pipe so as to control the direction of water flowing through the bypass pipe, and a controller, in a hot water usage mode, controlling the bypass valve so that the water moves from the first connection pipe to the second connection pipe through the bypass pipe, and in an inner circulation mode, controlling the bypass valve so that the water moves from the second connection pipe to the first connection pipe through the bypass pipe.

6 Claims, 10 Drawing Sheets

(51) Int. Cl.
  *F24D 19/00* (2006.01)
  *G05D 23/13* (2006.01)
  *F24D 17/00* (2006.01)

(52) U.S. Cl.
  CPC ..... *F24D 19/0095* (2013.01); *G05D 23/1393* (2013.01); *F24D 17/0026* (2013.01)

(58) Field of Classification Search
  CPC ............. F24D 17/0031; F24D 19/0095; F24D 19/1051; E03B 7/12
  See application file for complete search history.

(56) References Cited

U.S. PATENT DOCUMENTS

| | | | |
|---|---|---|---|
| 2012/0216998 A1* | 8/2012 | Kim | F24D 19/1051 165/200 |
| 2013/0247997 A1* | 9/2013 | Ng | F24H 1/107 137/13 |
| 2013/0312671 A1* | 11/2013 | Deivasigamani | G06F 17/30902 122/1 C |
| 2015/0204550 A1* | 7/2015 | Deivasigamani | F24D 19/1069 237/2 A |

FOREIGN PATENT DOCUMENTS

| | | | | |
|---|---|---|---|---|
| JP | 3811998 B2 | * | 8/2006 | |
| KR | 2003-0026604 | | 4/2003 | |
| KR | 20030026604 A | * | 4/2003 | |
| KR | 10-2004-0106651 | | 12/2004 | |
| KR | 10-2013-0004771 | | 1/2013 | |
| KR | 101370937 B1 | * | 3/2014 | ......... F24D 17/0031 |
| KR | 10-1542886 | | 8/2015 | |
| WO | 2013/005976 | | 1/2013 | |

OTHER PUBLICATIONS

WIPO, the International Search Report of PCT/KR2012/005288 dated Dec. 26, 2012.

KIPO, Notification of reason for refusal of KR 10-2016-0046997 dated Apr. 19, 2017.

* cited by examiner

WATER HEATER SYSTEM

CROSS-REFERENCE TO RELATED PATENT APPLICATION

This application claims the benefit of Korean Patent Application No. 10-2016-0046997, filed on Apr. 18, 2016, in the Korean Intellectual Property Office, the disclosure of which is incorporated herein in its entirety by reference.

BACKGROUND OF THE INVENTION

1. Field of the Invention

The present invention relates to a water heater system, and more particularly, to a water heater system which may easily control a temperature of hot water and prevent the system and pipes therein from freezing and bursting when hot water is not used.

2. Description of the Related Art

In a water heater, generally, running water in a low temperature flows through a running water pipe and is supplied to a heat exchanger. Then, the supplied water is heated using a burner and is discharged through a connection pipe so as to temporarily be stored in a buffer tank. The hot water stored in the buffer tank is provided to a user through a hot water pipe. Non-used hot water from the hot water supplied through the hot water pipe circulates along a bypass pipe and a running water pipe and is supplied to the heat exchanger. Such a conventional water heater system is disclosed in Korean Patent Publication No. 0443502.

However, when such a water heater system is used, hot water heated through the heat exchanger is provided to a user so that the user may hardly control a temperature of the hot water in detail. Also, in order to prevent the water heater from freezing and bursting, water circulates and is heated in the water heater so that when users need to use hot water at a temperature that they desires, the temperature of water may be hardly controlled.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Figure 1:
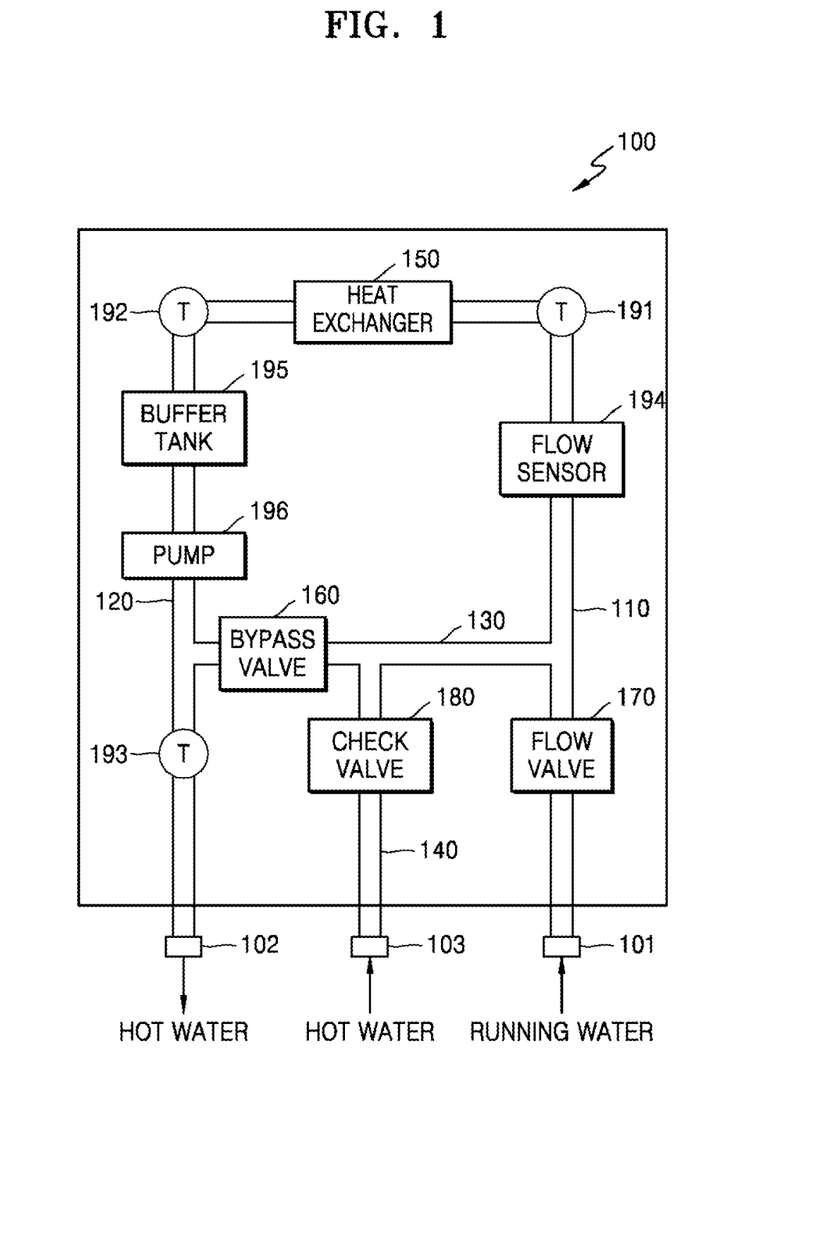
FIG. 1 schematically illustrates a water heater system according to an embodiment of the present invention.

FIG. 1 schematically illustrates a water heater system 100 according to an embodiment of the present invention.

Referring to FIG. 1, in the water heater system 100, running water is flowed through a running water inlet 101 and is heated in a heat exchanger 150. The hot water from the heat exchanger 150 may be discharged through a hot water outlet 102. When hot water is not used, the non-used hot water may circulate in the water heater system 100 through a bypass pipe 130 or may circulate in an outer pipe connected between the hot water outlet 102 and a hot water exchange hole 103. Thus, the water heater system 100 may include a first connection pipe 110, a second connection pipe 120, the bypass pipe 130, a bypass valve 160 and a controller (not illustrated).

The first connection pipe 110 may connect a gap between the running water inlet 101 and an entry of the heat exchanger 150. The second connection pipe 120 may connect a gap between an outlet of the heat exchanger 150 and the hot water outlet 102. That is, running water (water flowing from the outside) that is flowed through the running water inlet 101 is delivered to the heat exchanger 150 through the first connection pipe 110 and the delivered water is heated in the heat exchanger 150. Then, the heated running water, which is hot water, is discharged through the outlet of the heat exchanger 150 and may be delivered to the hot water outlet 102 through the second connection pipe 120.

In addition, the bypass pipe 130 is connected between the first connection pipe 110 and the second connection pipe 120. The running water flowing through the first connection pipe 110 may be mixed with hot water flowing through the second connection pipe 120 in the bypass pipe 130. According to the embodiment of the present invention, the bypass valve 160 is installed to the bypass pipe 130 and the controller controls the bypass valve 160 so that the direction of water flowing through the bypass pipe 130 may be controlled. That is, in a hot water usage mode, the controller controls the bypass valve 160 so that the water moves from the first connection pipe 110 to the second connection pipe 120 through the bypass pipe 130 and in an inner circulation mode, the controller controls the bypass valve 160 so that the water moves from the second connection pipe 120 to the first connection pipe 110 through the bypass pipe 130. Hereinafter, when a user uses hot water, it is called a 'hot water usage mode' and when a user does not use hot water and hot water circulates in the water heater system, it is called an 'inner circulation mode'. Such a mode may be selected by inputting a signal from the outside or by changes of hot water. When the mode is selected, the controller may control the bypass valve 160 according to the selected mode. The controller is not a part which may not be combined to a specific position and thereby is not illustrated in the drawing.

In the hot water usage mode, the bypass valve 160 is used in the water heater system 100 so that running water flowing through the first connection pipe 110 is delivered to the second connection pipe 120, and hot water flowing through the second connection pipe 120 is mixed with the running water delivered through the bypass pipe 130. Then, the mixed water is delivered to the hot water outlet 102 so as to control the temperature of the hot water discharged through the hot water outlet 102 in detail. The hot water usage mode will be described in more detail with reference to FIG. 2.

Also, in the inner circulation mode, hot water flowing through the second connection pipe 120 is delivered to the first connection pipe 110, and running water flowing through the first connection pipe 110 is mixed with hot water delivered through the bypass pipe 130. The mixed water is delivered to the heat exchanger 150 and then, the hot water discharged from the heat exchanger 150 is again delivered to the bypass pipe 130. Accordingly, the hot water circulates within the water heater system 100 so as to prevent the water heater system 100 from freezing and bursting and to immediately discharge hot water at a constant temperature when user requires. The inner circulation mode will be described in more detail with reference to FIG. 3.

In addition, the water heater system 100 may further include a flow valve 170. The flow valve 170 is installed to a gap between the bypass pipe 130 and the running water inlet 101 in the first connection pipe 110 and may control an amount of running water flowing in the running water inlet 101. Also, the flow valve 170 may include a sensor so as to sense a flow. In the hot water usage mode, the controller may control the flow valve 170 so as to control an amount of running water delivered through the first connection pipe 110. As an amount of running water is controlled, the temperature of hot water may be controlled. In addition, in the inner circulation mode, the controller may control the flow valve 170 so that running water may not be delivered to the water heater system 100 through the first connection pipe 110. That is, in the inner circulation mode, running water is not flowed in the water heater system 100 and instead, hot water circulates along the first connection pipe 110, the second connection pipe 120, and the bypass pipe 130. Therefore, the controller may control the flow valve 170 so that running water may not be flowed into the water heater system 100.

Also, the water heater system 100 may further include a first temperature sensor 191, a second temperature sensor 192, a third temperature sensor 193, a flow sensor 194, a buffer tank 195, and a pump 196. The flow sensor 194 is installed to a gap between the bypass pipe 130 and an entry of the heat exchanger 150 in the first connection pipe 110 and may sense an amount of water (water flowing into the heat exchanger 150) that moves along the first connection pipe 110. The first temperature sensor 191 is installed to gap between the entry of the heat exchanger 150 and the flow sensor 194 and may sense a temperature of water (water flowing into the heat exchanger 150) that moves along the first connection pipe 110.

The second temperature sensor 192 is installed to a gap between the bypass pipe 130 and an outlet of the heat exchanger 150 in the second connection pipe 120 and may sense a temperature of water (water discharging from the heat exchanger 150) that moves along the second connection pipe 120. The buffer tank 195 is installed to a gap between the second temperature sensor 192 and the bypass pipe 130 in the second connection pipe 120 and may temporarily store water that moves along the second connection pipe 120. The buffer tank 195 may prevent a sudden change of discharged hot water so as to prevent a discharge of unexpected hot water or a discharge of cold water flowing until hot water discharges, when a user requires using hot water.

The pump 196 may be connected between an outlet of the buffer tank 195 and the bypass pipe 130 in the second connection pipe 120. The pump 196 is used to deliver hot water to the hot water outlet 102 or the bypass pipe 130. The third temperature sensor 193 is installed to a gap between the bypass pipe 130 and the hot water outlet 102 in the second connection pipe 120 and may sense a temperature of water (water delivered to the hot water outlet 102) that moves along the second connection pipe 120. The controller may control the flow valve 170 so as to control an amount of flow by using the temperature sensed in the third temperature sensor 193.

Figure 2:
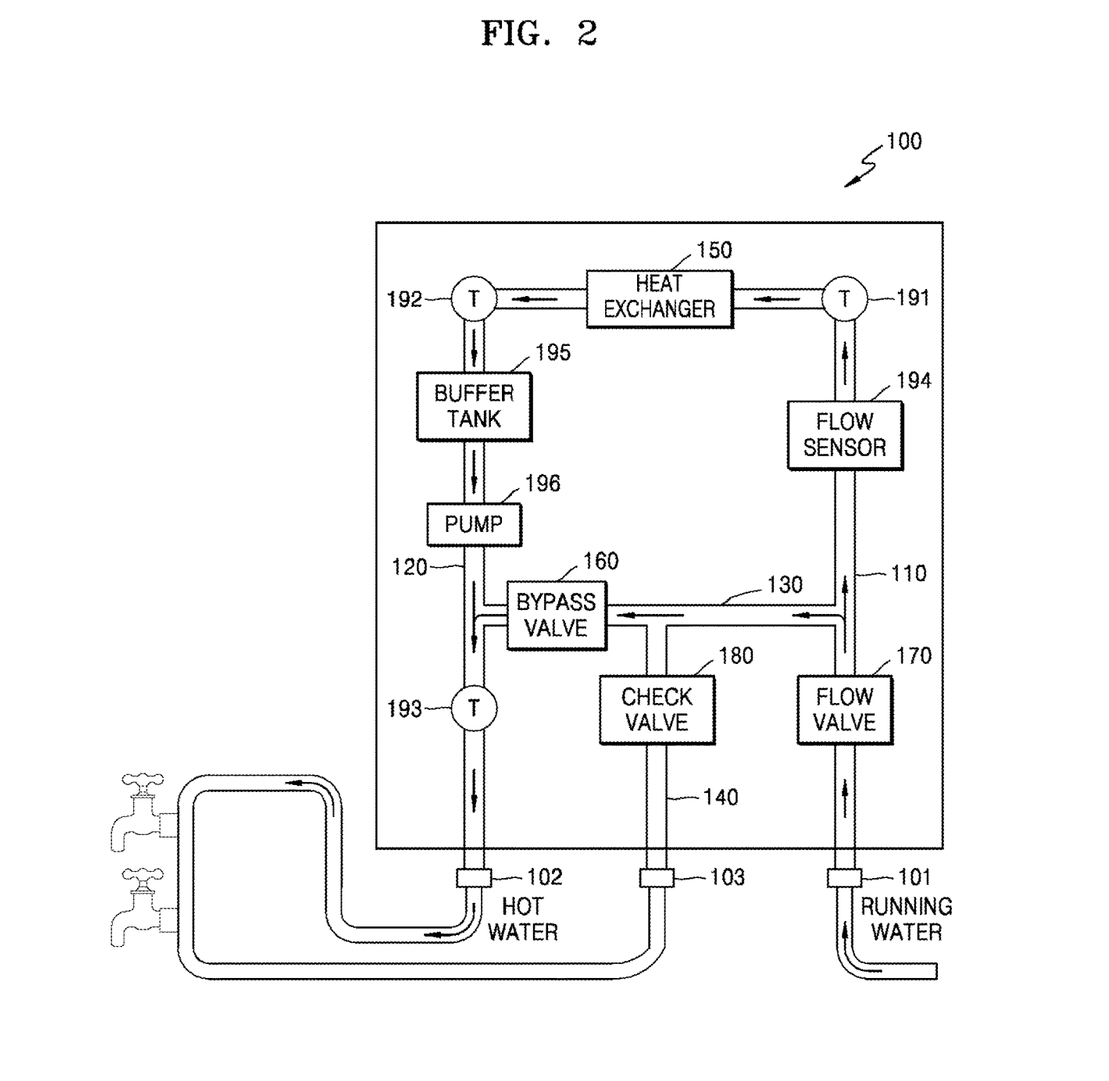
FIG. 2 illustrates a moving path of water in a hot water usage mode in the water heater system of FIG. 1.

In addition, the water heater system 100 may further include the hot water exchange hole 103 (위에서 언급됨), a third connection pipe 140, and a first check valve 180. The hot water exchange hole 103 is a room where hot water that is not used from the hot water discharged through the hot water outlet 102 may be flowed in. As illustrated in FIG. 2, the hot water outlet 102 and the hot water exchange hole 103 may be connected to each other by using a pipe. The non-used hot water may be made in such a way that a user turns off a tap or may be leftover after a larger amount of hot water is discharged through the hot water outlet 102 than a user requires. The third connection pipe 140 may be connected to a gap between a position disposed between the bypass valve 160 and the first connection pipe 110 in the bypass pipe, and the hot water exchange hole 103. The first check valve 180 is installed in the third connection pipe 140 so that how water may be or may not be delivered to the bypass pipe 130 through the third connection pipe 140.

In the hot water usage mode, the controller controls and turns off the first check valve 180 so that hot water discharged through the hot water outlet 102 may all be delivered to a user by using a tap. Also, the controller controls and turns on the first check valve 180 so that when hot water is flowed through the hot water exchange hole 103, the flowed hot water may be delivered to the bypass pipe 130. In the inner circulation mode, the controller controls and turns off the first check valve 180 so that hot water may not be delivered to the bypass pipe 130 through the third connection pipe 140.

In an outer circulation mode, the controller controls the bypass valve 160 to be turned off and the first check valve 180 to be turned on. Accordingly, the hot water delivered through the second connection pipe 120 may not be delivered to the bypass pipe 130. Also, the hot water delivered through the hot water exchange hole 103 may be delivered to the bypass pipe 130 through the third connection pipe 140. In such the outer circulation mode, the controller may control the flow valve 170 so that running water may not be flowed in the water heater system 100. The outer circulation mode allows that hot water continuously flows in a pipe connected between the hot water outlet 102 and the hot water exchange hole 103 so as to prevent the pipe from freezing and bursting. Also, when a user needs hot water, hot water at a constant temperature may be immediately used. The pipe connected between the hot water outlet 102 and the hot water exchange hole 103 may be a pipe connected to a tap. In addition, hot water flows in almost all connection pipes within the water heater system 100 so as to prevent the water heater system 100 from freezing and bursting. The outer circulation mode will be described in more detail with reference to FIG. 4.

In a complex circulation mode, the controller may control the bypass valve 160 so that water may move from the second connection pipe 120 to the first connection pipe 110 through the bypass pipe 130. Also the controller may control the first check valve 180 to be turned on. Accordingly, hot water delivered through the second connection pipe 120 may be delivered to both the bypass pipe 130 and the hot water outlet 102 and hot water delivered through the hot water exchange hole 103 may be delivered to the bypass pipe 130 through the third connection pipe 140. In such the complex circulation mode, the controller may control the flow valve 170 so that running water may not be flowed in the water heater system 100. The complex circulation mode allows that hot water continuously flows in the pipe connected between the hot water outlet 102 and the hot water exchange hole 103 and thus, the hot water continuously flows in the water heater system 100 so as to prevent the pipe and the water heater system 100 from freezing and bursting. Also, when a user needs hot water, hot water at a constant temperature may be immediately used. The pipe connected between the hot water outlet 102 and the hot water exchange hole 103 may be a pipe connected to a tap. The complex circulation mode will be described in more detail with reference to FIG. 5.

As above, the outer circulation mode and the complex circulation mode are separately explained. However, both modes prevent not only pipes connected to the outside but also the water heater system itself from freezing and bursting. Accordingly, both modes may be operated as one mode. For example, when a user selects a freeze protection mode or when it is sensed that a temperature outside is decreased to below a certain degree, the controller may select one of the outer circulation mode and the complex circulation mode.

Hereinafter, paths that water flows in each mode will be described with reference to FIGS. 2 through 4.

FIG. 2 illustrates a moving path of water in the hot water usage mode within the water heater system 100 of FIG. 1.

Referring to FIGS. 1 and 2, in the hot water usage mode, the controller may control the bypass valve 160 so that the flow valve 170 is turned on so as to deliver running water to the first connection pipe 110 and to deliver running water from the first connection pipe 110 to the second connection pipe 120 through the bypass pipe 130. Accordingly, the running water flowed to the first connection pipe 110 may be partly delivered to the second connection pipe 120 through the heat exchanger 150 and the remaining running water may be delivered to the second connection pipe 120 through the bypass pipe 130. Thus, the hot water heated through the heat exchanger 150 is mixed with the running water delivered through the bypass pipe 130, and the mixed water may be discharged through the hot water outlet 102. Then, such the water delivered to the outside is discharged through a tap and is used by a user. The controller may control the first check valve 180 to be turned off or turned on. When the first check valve 180 is turned off, the water may all be discharged outside through the hot water outlet 102 by using a tap only. When the first check valve 180 is turned on, the water remained after a user uses may be flowed to the third connection pipe 140 through the hot water exchange hole 103.

Figure 3:
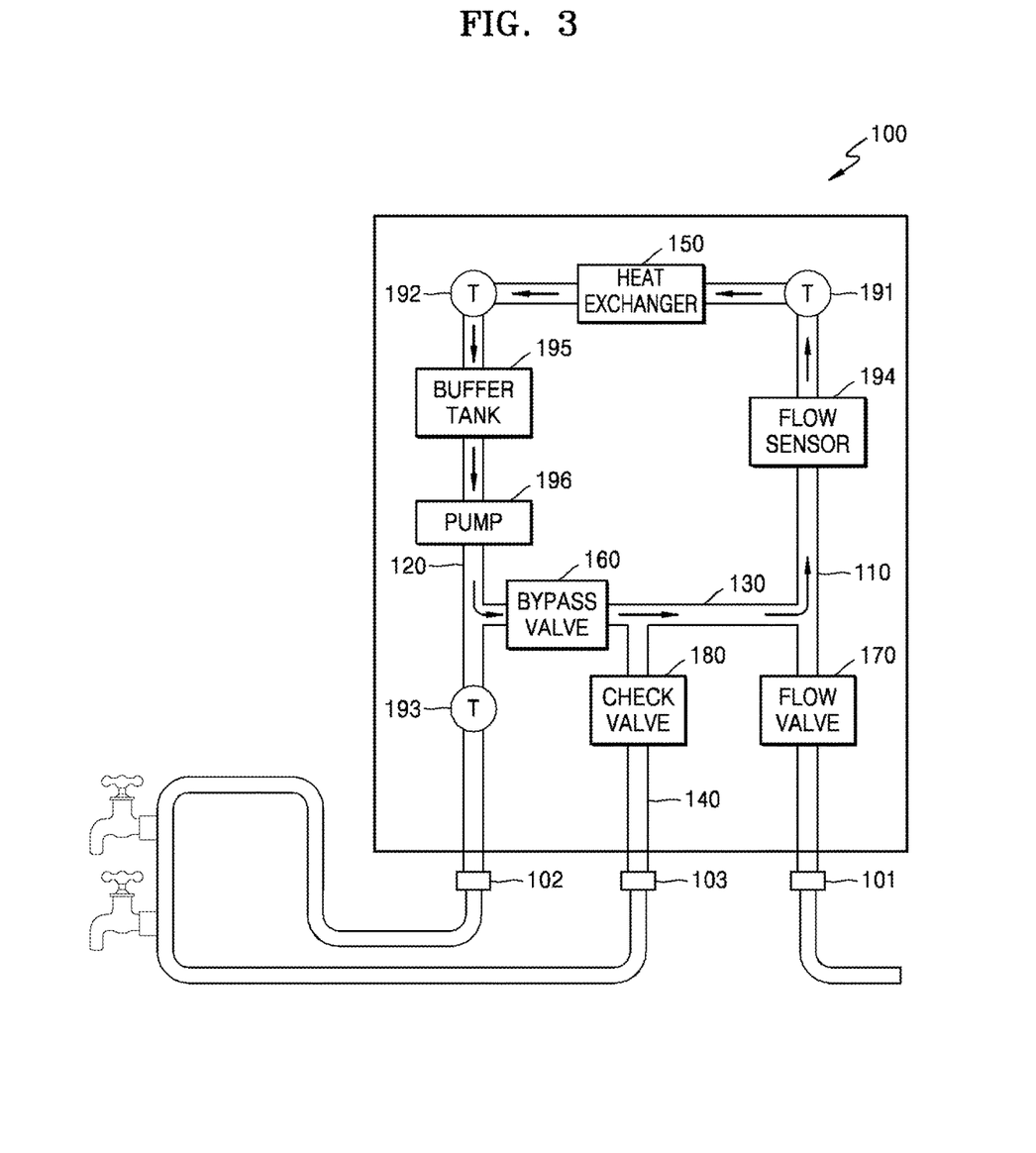
FIG. 3 illustrates a moving path of water in an inner circulation mode in the water heater system of FIG. 1.

FIG. 3 illustrates a moving path of water in the inner circulation mode in the water heater system 100 of FIG. 1.

Referring to FIGS. 1 through 3, in the inner circulation mode, the controller may control the flow valve 170 and the first check valve 180 to be turned off and the bypass valve 160 so that hot water may be delivered from the second connection pipe 120 to the first connection pipe 110 through the bypass pipe 130. As illustrated in FIG. 3, the hot water discharged through the heat exchanger 150 circulates and flows the second connection pipe 120, the bypass pipe 130, and the first connection pipe 110. Accordingly, when a tap is not turned on from the outside, hot water continuously circulates in the water heater system 100 so as to prevent the water heater system 100 from freezing and bursting. Also, when the tap is turned on by a user, water circulating in the water heater system 100 is firstly discharged and thus, hot water at a constant temperature may be discharged.

Figure 4:
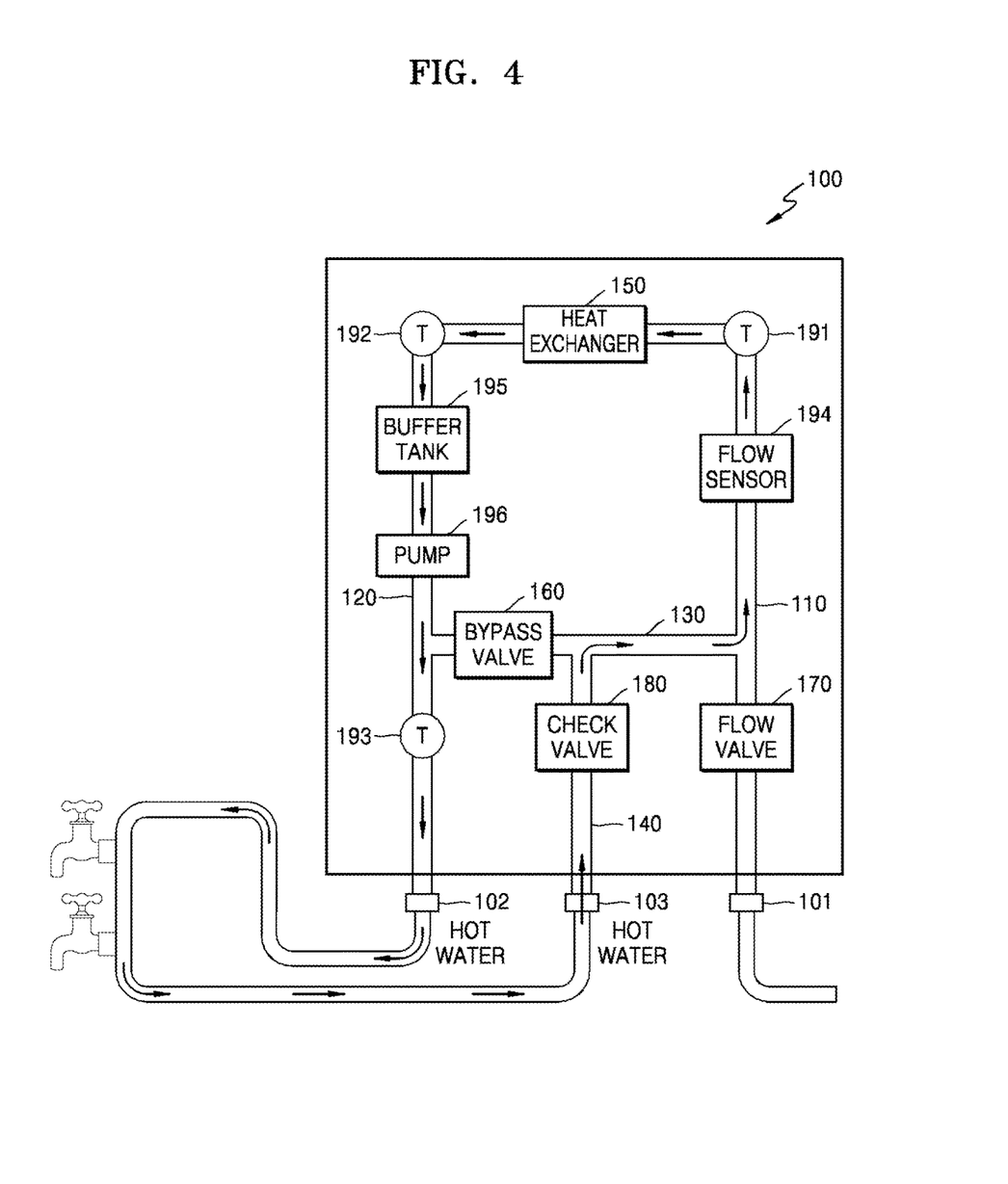
FIG. 4 illustrates a moving path of water in an outer circulation mode in the water heater system of FIG. 1.

FIG. 4 illustrates a moving path of water in the outer circulation mode in the water heater system 100 of FIG. 1.

Referring to FIGS. 1 through 4, in the outer circulation mode, the controller may control the bypass valve 160 to be turned off and the flow valve 170 and the first check valve 180 to be turned on. When the valves are operated as illustrated, the hot water discharged through the heat exchanger 150 is delivered to the pipe outside through the second connection pipe 120 and the hot water outlet 102 and the hot water delivered to the pipe flows to the heat exchanger 150 through the hot water exchange hole 103, the third connection pipe 140, the bypass pipe 130, and the first connection pipe 110, as illustrated in FIG. 4. Such a route is repeated so that the hot water circulates and flows in the water heater system 100. Accordingly, when the tap is not turned on, the hot water continuously circulates in the pipe outside and the connection pipes in the water heater system 100 so as to prevent the pipe outside and the water heater system 100 from freezing and bursting. Also, when the tap is turned on by a user, water circulating in the water heater system 100 is firstly discharged and thus, hot water at a constant temperature may be discharged.

Figure 5:
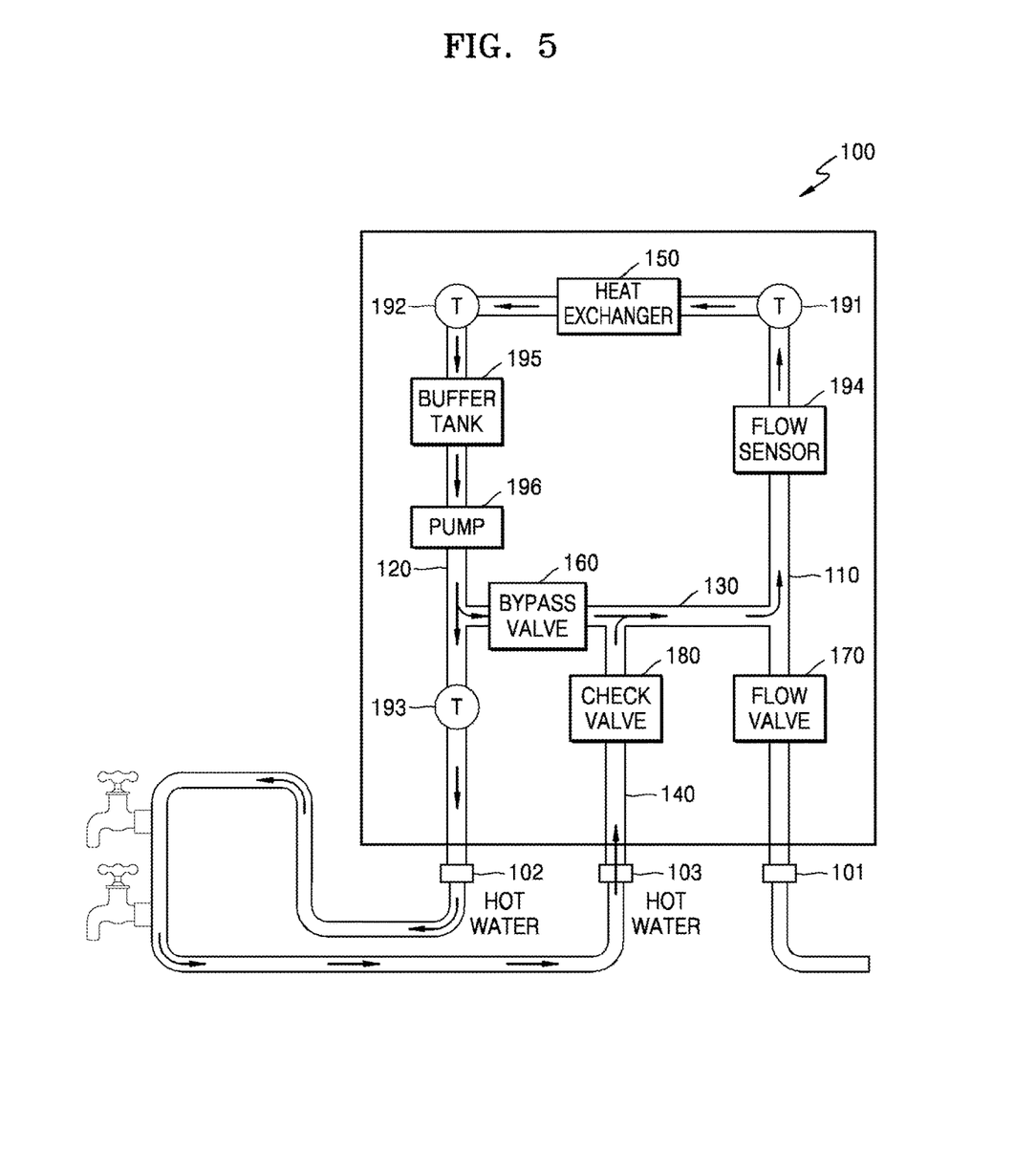
FIG. 5 illustrates a moving path of water in a complex circulation mode in the water heater system of FIG. 1.

FIG. 5 illustrates a moving path of water in the complex circulation mode in the water heater system 100 of FIG. 1.

Referring to FIGS. 1 through 5, in the complex circulation mode, the controller may control the flow valve 170 and the first check valve 180 to be turned on and the bypass valve 160 so that hot water may be delivered from the second connection pipe 120 to the first connection pipe 110 through the bypass pipe 130. When the valves are operated as illustrated, the hot water discharged through the heat exchanger 150 is delivered to the pipe outside through the second connection pipe 120 and the hot water outlet 102 and is also delivered to the bypass pipe 130 through the bypass valve 160, as illustrated in FIG. 5. Also, the hot water delivered to the pipe is delivered to the bypass pipe 130 through the third connection pipe 140. The hot water delivered through the second connection pipe 120 is mixed with the hot water delivered through the third connection pipe 140 in the bypass pipe 130. The mixed water is delivered to the heat exchanger 150 through the first connection pipe 110. Such a route is repeated so that the hot water circulates and flows in the water heater system 100. Accordingly, when the tap is not turned on from the outside, the hot water continuously circulates in the pipe outside and the connection pipes in the water heater system 100 so as to prevent the pipe outside and the water heater system 100 from freezing and bursting. Also, when the tap is turned on by a user, water circulating in the water heater system 100 is firstly discharged and thus, hot water at a constant temperature may be discharged FIG. 6 schematically illustrates a water heater system 600 according to another embodiment of the present invention.

Figure 6:
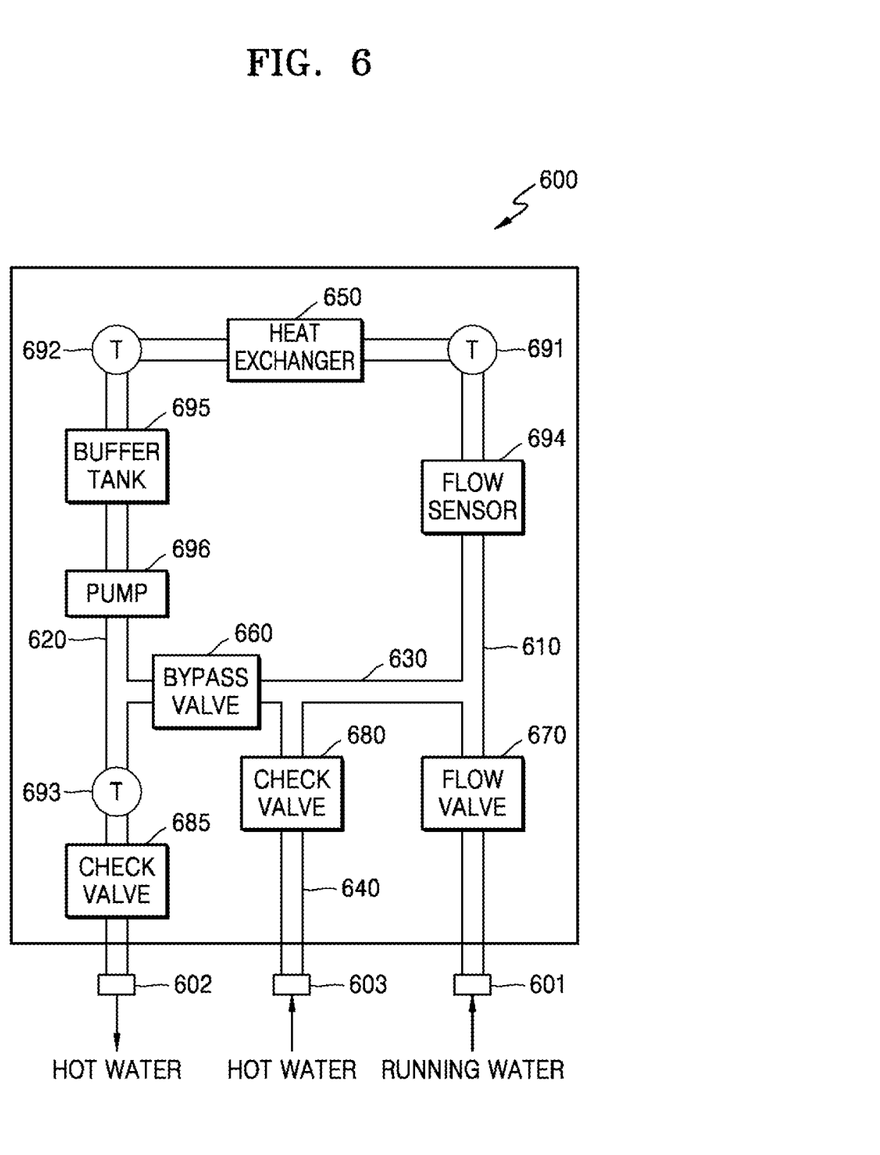
FIG. 6 schematically illustrates a water heater system according to another embodiment of the present invention.

Referring to FIGS. 1 through 6, the water heater system 600 of FIG. 6 is the same as the water heater system 100 of FIG. 1 except for a second check valve 685. That is, a first connection pipe 610, a second connection pipe 620, a third connection pipe 640, a bypass pipe 630, a heat exchanger 650, a bypass valve 660, a flow valve 670, a first check valve 680, a first temperature sensor 691, a second temperature sensor 692, a third temperature sensor 693, a flow sensor 694, a buffer tank 695, a pump 696, and a controller (not illustrated) in the water heater system 600 are the same elements as the elements in FIG. 1 and thus, descriptions thereof are omitted herein.

The second check valve 685 may be installed to a gap between the bypass pipe 630 in the second connection pipe 620 and a hot water outlet 602. In the hot water usage mode, the outer circulation mode, and the complex circulation mode, the controller may control the second check valve 685 to be turned on. In the inner circulation mode, the controller may control the second check valve 685 to be turned off. As the second check valve 685 is turned on in the hot water usage mode, the outer circulation mode, and the complex circulation mode, operations in these modes are the same as described above with reference to FIG. 1

Hereinafter, only the inner circulation mode will be described in detail with reference to FIG. 7.

Figure 7:
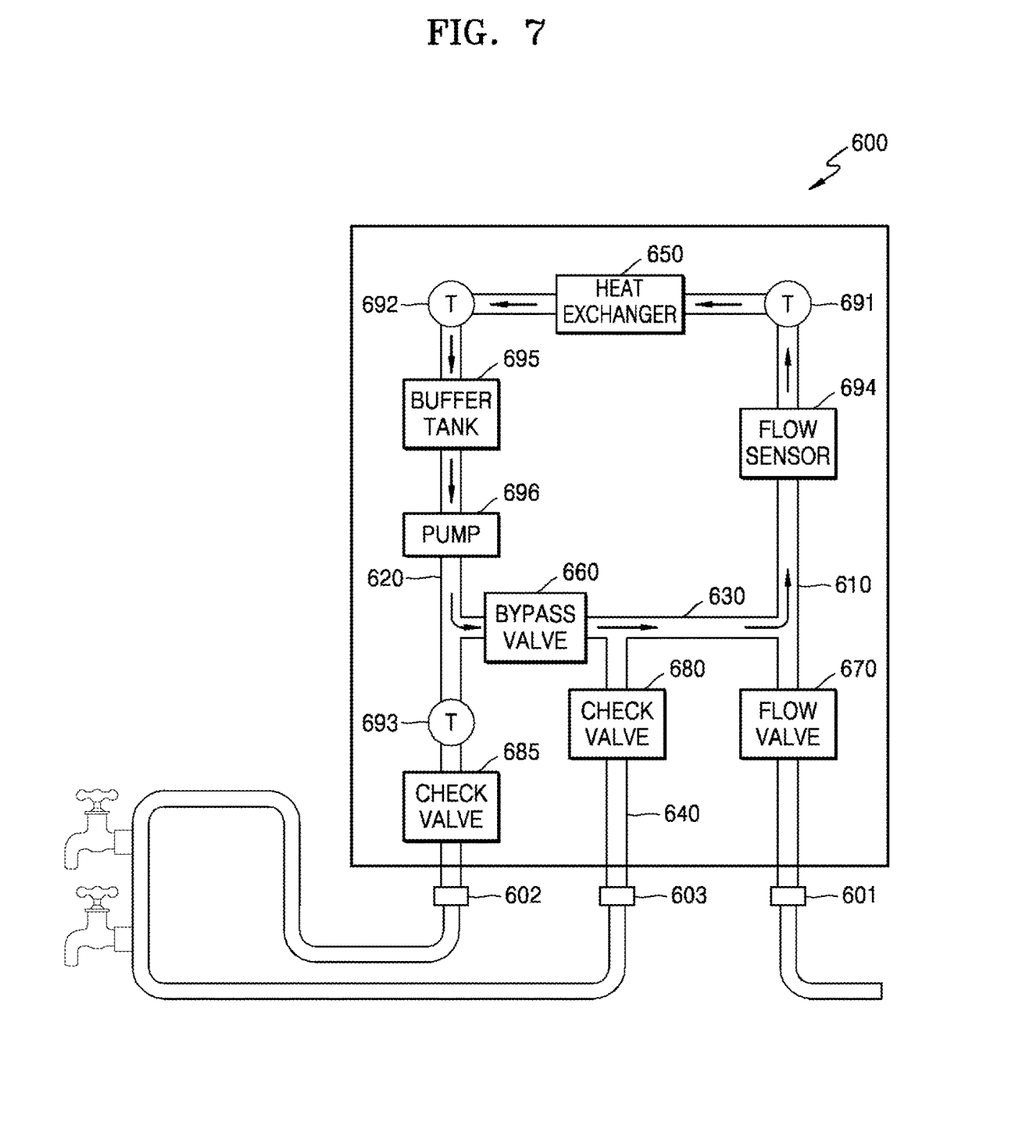
FIG. 7 illustrates a moving path of water in an inner circulation mode in the water heater system of FIG. 6.

FIG. 7 illustrates a moving path of water in the inner circulation mode in the water heater system 600 of FIG. 6.

Referring to FIGS. 1 through 7, in the inner circulation mode, the controller may control the flow valve 670, the first check valve 180, and the second check valve 685 to be turned off and the bypass valve 660 so that hot water may be delivered from the second connection pipe 620 to the first connection pipe 610 through the bypass pipe 630. As illustrated in FIG. 7, the hot water discharged through the heat exchanger 650 circulates and flows the second connection pipe 620, the bypass pipe 630, and the first connection pipe 610. Accordingly, when a tap is not turned on from the outside, hot water continuously circulates in the water heater system 600 so as to prevent the water heater system 600 from freezing and bursting. Also, when the tap is turned on by a user, water circulating in the water heater system 600 is firstly discharged and thus, hot water at a constant temperature may be discharged. In the water heater system 100 of FIG. 1, as the first check valve 180 is turned off in the inner circulation mode, the hot water delivered through the second connection pipe 120 is not delivered to the pipe outside and instead, is delivered to the bypass pipe 130. However, as the water heater system 600 of FIG. 6 further includes the second check valve 685, a path by which the hot water is delivered to the hot water outlet 602 is blocked and accordingly, the inner circulation mode may be operated more efficiently than that of in the water heater system 100 of FIG. 1.

Figure 8:
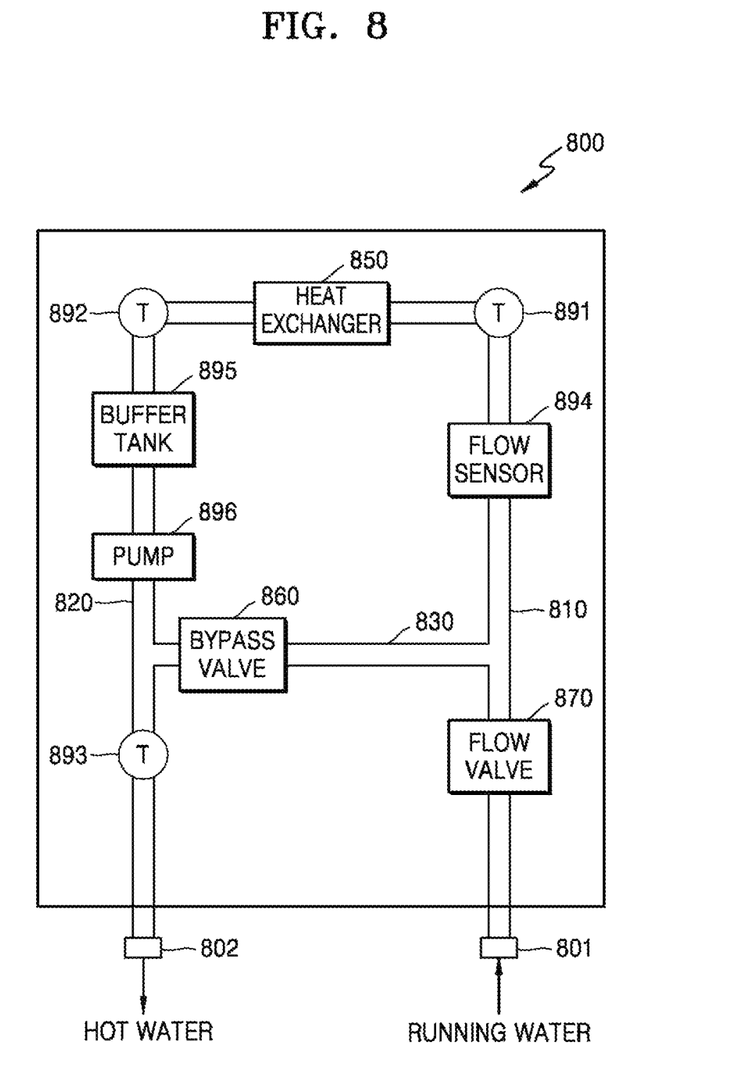
FIG. 8 schematically illustrates a water heater system according to another embodiment of the present invention.

FIG. 8 schematically illustrates a water heater system 800 according to another embodiment of the present invention.

Referring to FIGS. 1 through 8, the water heater system 800 of FIG. 8 is the same as the water heater system 100 of FIG. 1 except that there is no hot water exchange hole. That is, the water heater system 800 of FIG. 8 is the same as the water heater system 100 of FIG. 1 except for the third connection pipe 140, the first check valve 180, and the hot water exchange hole 103. The other elements, that is, a first connection pipe 810, a second connection pipe 820, a bypass pipe 830, a heat exchanger 850, a bypass valve 860, a flow valve 870, a first temperature sensor 891, a second temperature sensor 892, a third temperature sensor 893, a flow sensor 894, a buffer tank 895, a pump 896, and a controller (not illustrated) in the water heater system 800 are the same elements as the elements in FIG. 1 and thus, descriptions thereof are omitted herein. Also, in the water heater system 800 of FIG. 8, hot water discharged outside is not exchanged so that a pipe is not connected between a hot water outlet 802 and a hot water exchange hole and a pipe is only connected between the hot water outlet 802 and a tap. Accordingly, the water heater system 800 of FIG. 8 is operated only in the hot water usage mode and the inner circulation mode and is not operated in the outer circulation mode and the complex circulation mode. The hot water usage mode will be described with reference to FIG. 9 and the inner circulation mode will be described with reference to FIG. 10.

Figure 9:
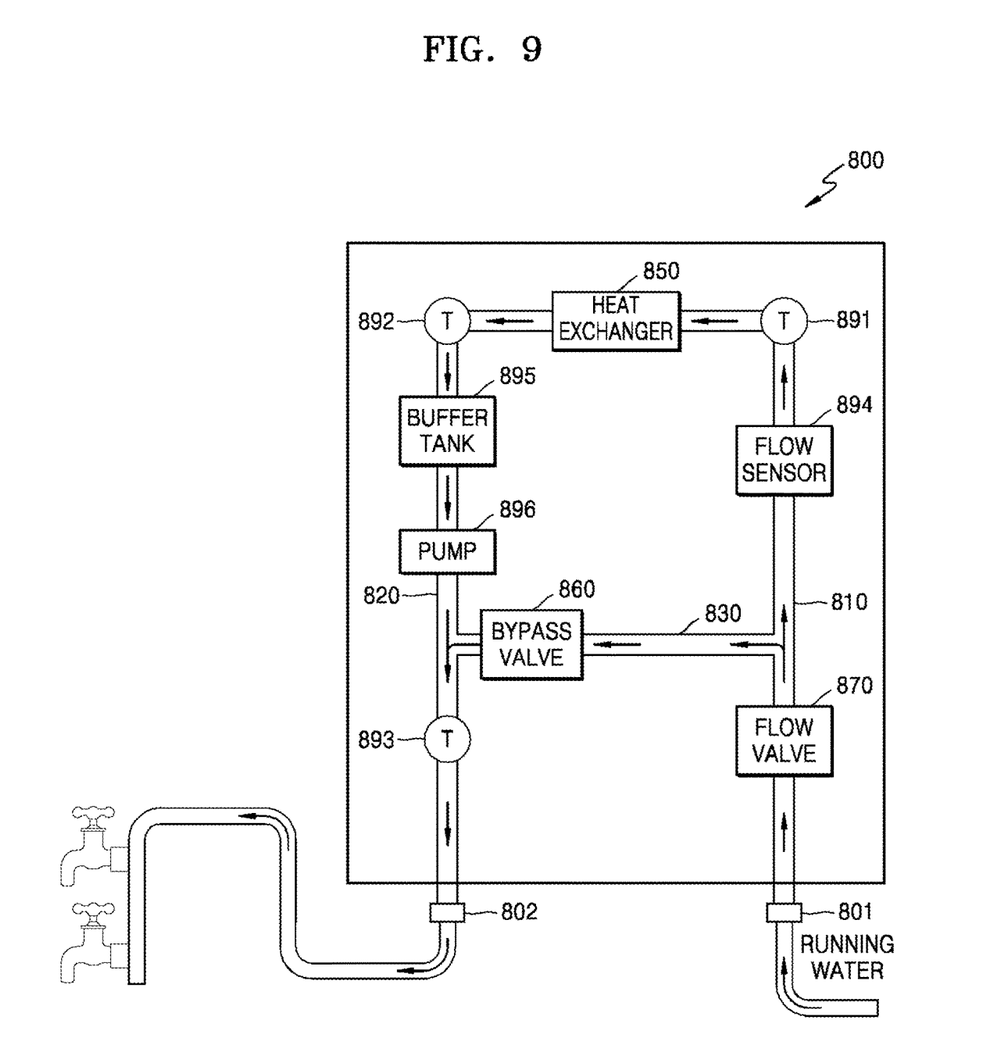
FIG. 9 illustrates a moving path of water in a hot water usage mode in the water heater system of FIG. 8.

FIG. 9 illustrates a moving path of water in the hot water usage mode in the water heater system 800 of FIG. 8.

Referring to FIGS. 1 through 9, in the hot water usage mode, the controller may control the bypass valve 860 so that the flow valve 870 is turned on so as to deliver running water to the first connection pipe 810 and to deliver running water from the first connection pipe 810 to the second connection pipe 820 through the bypass pipe 830. Accordingly, the running water flowed to the first connection pipe 810 may be partly delivered to the second connection pipe 820 through the heat exchanger 850 and the remaining running water may be delivered to the second connection pipe 820 through the bypass pipe 830. Thus, the hot water heated through the heat exchanger 850 is mixed with the running water delivered through the bypass pipe 830, and the mixed water may be discharged outside through the hot water outlet 802. Then, such the water delivered to the outside is discharged through a tap and is used by a user.

Figure 10:
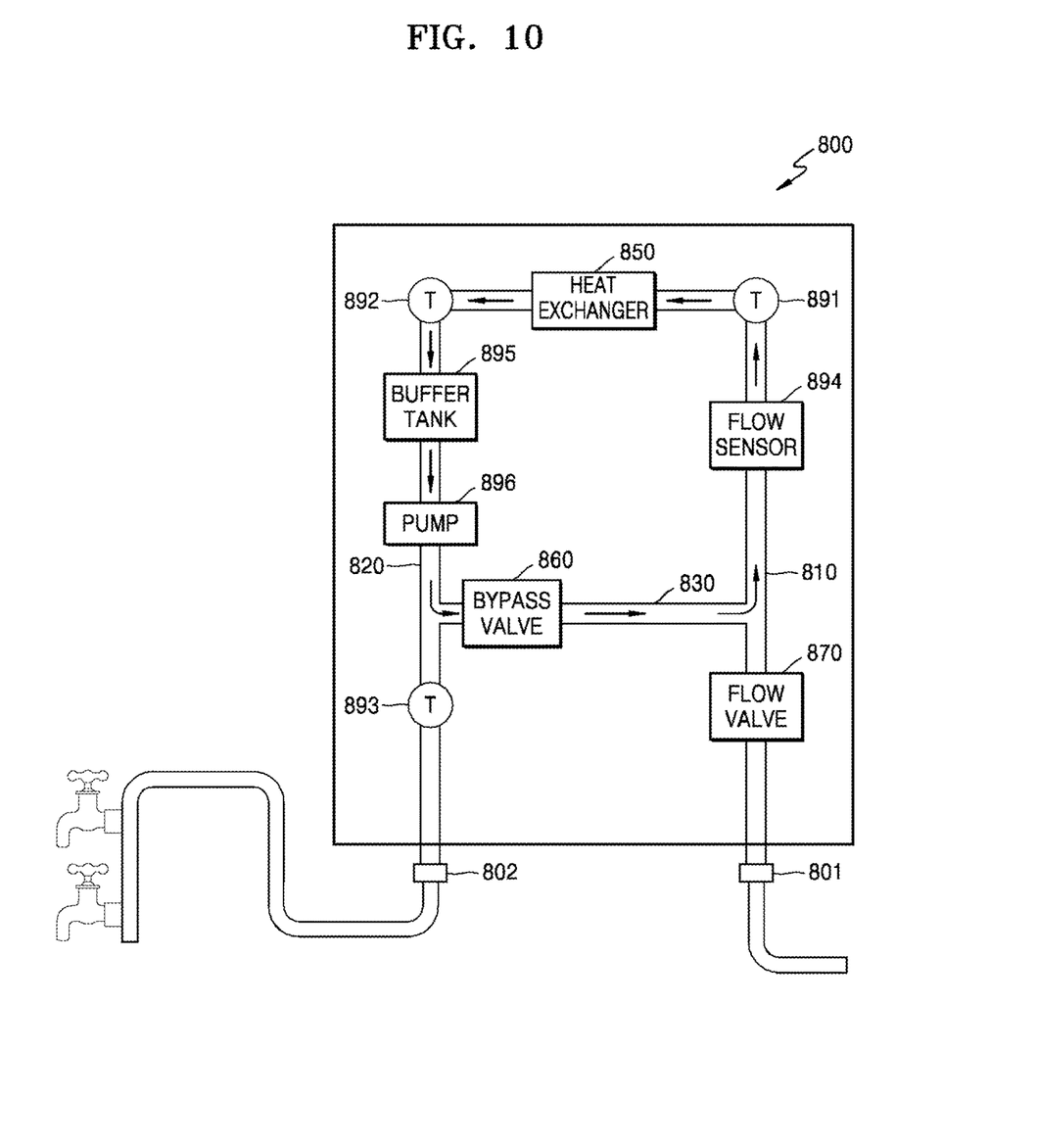
FIG. 10 illustrates a moving path of water in an inner circulation mode in the water heater system of FIG. 9.

FIG. 10 illustrates a moving path of water in the inner circulation mode in the water heater system 800 of FIG. 9.

Referring to FIGS. 1 through 10, in the inner circulation mode, the controller may control the flow valve 870 to be turned off and the bypass valve 860 so that hot water may be delivered from the second connection pipe 820 to the first connection pipe 810 through the bypass pipe 830. As illustrated in FIG. 8, the hot water discharged through the heat exchanger 850 circulates and flows the second connection pipe 820, the bypass pipe 830, and the first connection pipe 810. Accordingly, when a tap is not turned on from the outside, hot water continuously circulates in the water heater system 800 so as to prevent the water heater system 800 from freezing and bursting. Also, when the tap is turned on by a user, water circulating in the water heater system 100 is firstly discharged and thus, hot water at a constant temperature may be discharged. In the water heater system 100 of FIG. 1, as the first check valve 180 is turned off in the inner circulation mode, the hot water delivered through the second connection pipe 120 is not delivered to the pipe outside and instead, is delivered to the bypass pipe 130. Similarly, in the water heater system 800 of FIG. 8, a pipe connected to the hot water outlet 802 is blocked so that when the tap is turned off, the hot water is not delivered to the hot water outlet 802 and thus the inner circulation mode may be operated in the water heater system 800 of FIG. 8.

According to an embodiment of the present invention, a bypass valve is installed to a bypass pipe in a water heater system. Thus, when hot water is required, hot water heated in the heat exchanger is mixed with running water and hot water at a user's required temperature may be provided. When hot water is not used, a path of water flowing through the bypass pipe is changed and the hot water circulates in the water heater system. Accordingly, the water heater system may be prevented from freezing and bursting and hot water may be provided immediately after a user turns on a tap.

According to another embodiment of the present invention, non-used hot water discharged from the water heater system may be flowed again in the water heater system and circulate in the water heater system. The circulating hot water moves inside and outside the water heater system so as to keep the water heater system at a constant temperature. Therefore, the pipe outside may be prevented from freezing and bursting and hot water may be provided immediately after a user turns on a tap.

The water heater system according to embodiments of the present invention has a simple structure and temperature of hot water therein may be controlled in detail. In addition, freezing and bursting of not only the water heater system but also the pipe outside may be prevented and thus convenience of users may be maximized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A water heater system having a running water inlet through which running water flows in and a hot water outlet through which hot water heated in a heat exchanger is discharged, the water heater system comprising:
   a first connection pipe connecting the running water inlet and an entry of the heat exchanger;
   a second connection pipe connecting an outlet of the heat exchanger and the hot water outlet;
   a bypass pipe connecting the first connection pipe and the second connection pipe;
   a bypass valve installed in the bypass pipe so as to control a direction of water flowing through the bypass pipe;
   a hot water exchange hole where unused hot water discharged through the hot water outlet is flowed in;
   a third connection pipe connecting the bypass pipe and the hot water exchange hole, the third connection pipe being connected to a portion of the bypass pipe between the bypass valve and the first connection pipe;
   a first check valve installed in the third connection pipe; and
   a controller, in a hot water usage mode, controlling the bypass valve so that the water moves from the first connection pipe to the second connection pipe through the bypass pipe, and in an inner circulation mode, controlling the bypass valve so that the water moves from the second connection pipe to the first connection pipe through the bypass pipe,
   wherein the controller, in the inner circulation mode, controls the first check valve to be closed and, in an outer circulation mode or in a complex circulation mode, controls the first check valve to be opened.

2. The water heater system of claim 1, further comprising a flow valve installed in the first connection pipe between the bypass pipe and the running water inlet so as to control an amount of running water flowing in the running water inlet,
   wherein the controller, in the hot water usage mode, controls the flow valve so as to control an amount of running water delivered through the first connection pipe and, in the inner circulation mode, controls the flow valve so that running water from the running water inlet is not delivered to the water heater system through the first connection pipe.

3. The controller of claim 1, wherein the controller, in the outer circulation mode, controls the bypass valve to be closed and, in the complex circulation mode, controls the bypass valve so that water moves from the second connection pipe to the first connection pipe through the bypass pipe.

4. The water heater system of claim 1, further comprising a flow valve installed between the bypass pipe and the running water inlet in the first connection pipe so as to control an amount of running water flowing in the running water inlet,
   wherein the controller, in the hot water usage mode, controls the flow valve so as to control an amount of running water delivered through the first connection pipe and, in the inner circulation mode, in the outer circulation mode, and in the complex circulation mode, controls the flow valve so that running water from the running water inlet is not delivered to the water heater system through the first connection pipe.

5. The water heater system of claim 1, further comprising a second check valve installed between the bypass pipe in the second connection pipe and the hot water outlet,
   wherein the controller, in the hot water usage mode, in the outer circulation mode, and in the complex circulation mode, controls the second check valve to be opened and, in the inner circulation mode, controls the second check valve to be closed.

6. The water heater system of claim 1, further comprising:
   a flow sensor installed between the bypass pipe and the entry of the heat exchanger in the first connection pipe so as to sense an amount of water that moves along the first connection pipe;
   a first temperature sensor installed between the entry of the heat exchanger and the flow sensor so as to sense a temperature of water that moves along the first connection pipe;
   a second temperature sensor installed between the bypass pipe and an outlet of the heat exchanger in the second connection pipe so as to sense a temperature of water that moves along the second connection pipe;
   a buffer tank installed between the second temperature sensor and the bypass pipe in the second connection pipe so as to temporarily store water that moves along the second connection pipe;
   a pump connected between an outlet of the buffer tank and the bypass pipe in the second connection pipe; and
   a third temperature sensor installed between the bypass pipe and the hot water outlet in the second connection pipe so as to sense a temperature of water that moves along the second connection pipe.

* * * * *